T. M. MUELLER.
TRANSMISSION MECHANISM.
APPLICATION FILED OCT. 27, 1913.
1,169,419.
Patented Jan. 25, 1916.
2 SHEETS—SHEET 1.
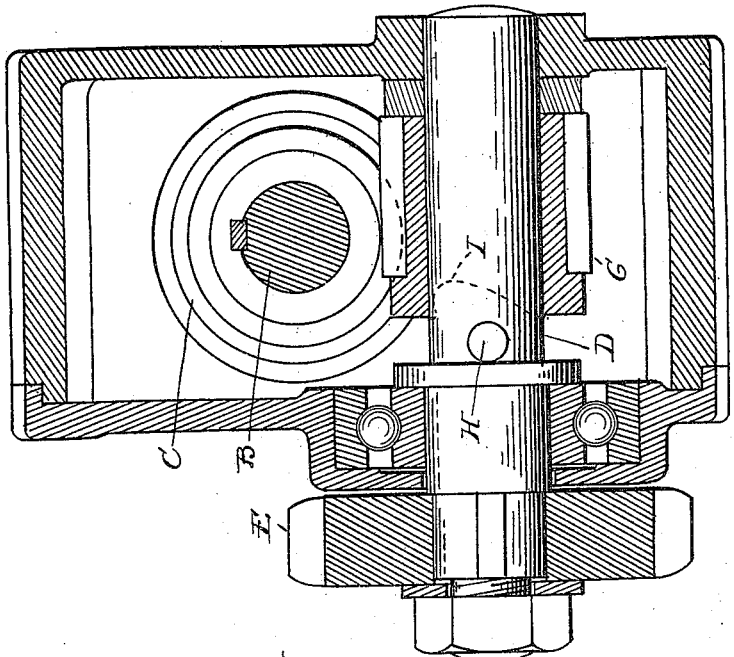
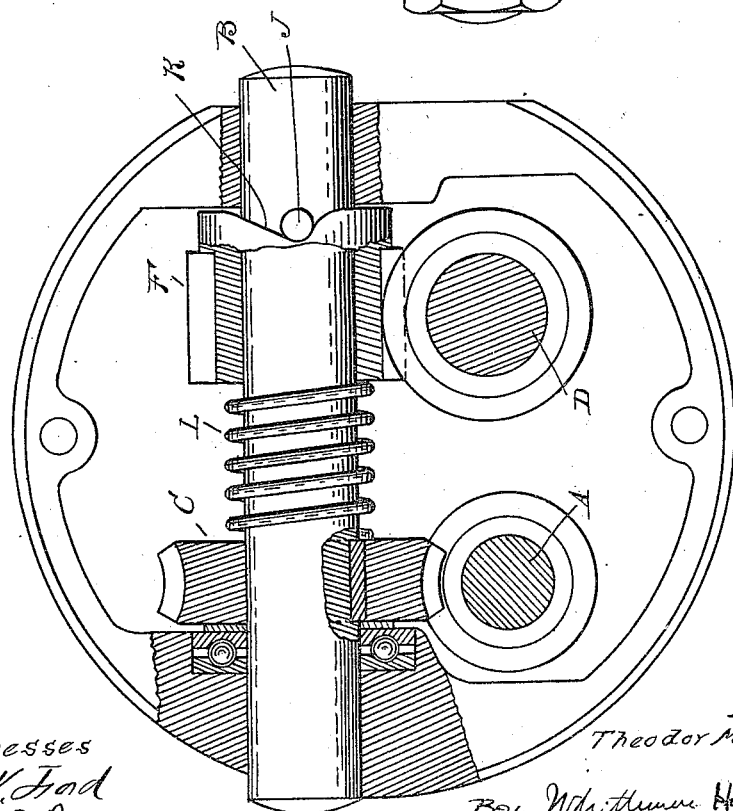
Witnesses
W. K. Ford
James P. Barry
Inventor
Theodor M. Mueller
By Whitmore Hulbert & Whitmore
Attys

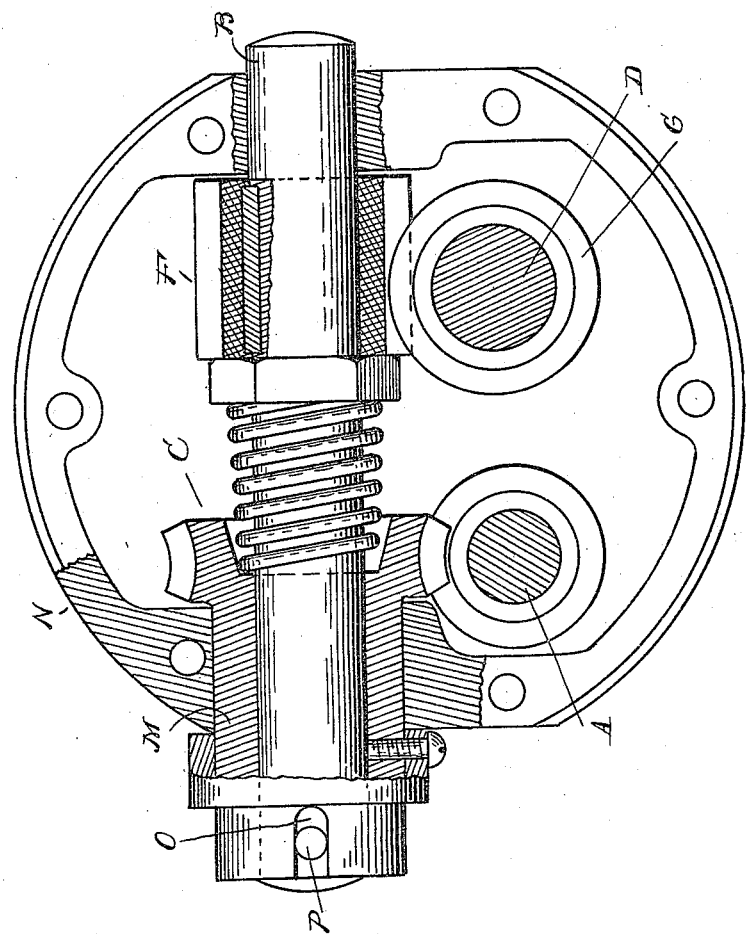

UNITED STATES PATENT OFFICE.

THEODOR M. MUELLER, OF DETROIT, MICHIGAN, ASSIGNOR TO MAXIMUM ELECTRICAL COMPANY, OF DETROIT, MICHIGAN, A CORPORATION OF MICHIGAN.

TRANSMISSION MECHANISM.

1,169,419.　　　　　Specification of Letters Patent.　　Patented Jan. 25, 1916.

Application filed October 27, 1913. Serial No. 797,380.

*To all whom it may concern:*

Be it known that I, THEODOR M. MUELLER, a subject of the Emperor of Germany, residing at Detroit, in the county of Wayne and State of Michigan, have invented certain new and useful Improvements in Transmission Mechanisms, of which the following is a specification, reference being had therein to the accompanying drawings.

The invention relates to transmission mechanisms more particularly designed for use in connecting starting motors with combustion motors, such as are used on many constructions of automobiles.

It is the object of the invention to obtain with a simple mechanical construction a transmission which is normally disconnected, but which will automatically couple when the starting motor is in operation and will automatically release when the combustion engine is started.

It is a further object to provide a safety release, which in case of back-firing of the combustion motor, will prevent the stripping of the gears or the breaking of any part of the mechanism.

These objects I have attained by the construction as hereinafter set forth.

In the drawings: Figure 1 is a cross section through the housing of the transmission in the plane of the driven shaft; Fig. 2 is a sectional elevation at right angles to Fig. 1; and Fig. 3 is a view similar to Fig. 2 illustrating a modified construction.

A is the drive-shaft connected with the armature-shaft of the starting motor.

B is a shaft driven from the shaft A preferably by an irreversible gearing C, and, as shown, a worm gearing.

D is a shaft connected by a sprocket E or other driving connection with the combustion motor (not shown).

F and G are spiral gears for transmitting motion from the shaft B to the shaft D, the gear G being preferably sleeved upon said shaft D.

H is a clutch for coupling the gear G with the shaft D, which, as shown, comprises a pin passing through the shaft and engageable with cam notches I formed in the end of the gear.

With the construction as thus far described, whenever the shaft A is revolved motion is transmitted therefrom through the worm gearing C to the shaft B, and from the latter through the spiral gear F to the spiral gear G. The shaft D is initially disconnected from the spiral gear G, but when the latter is actuated by the gear F, there will be a longitudinal sliding movement on the shaft D, due to the end thrust on said gear, which will engage the clutch pin H with the notches I. This couples the shaft D and gear G, so that the movement will be positively transmitted from the starting motor to the shaft of the combustion engine.

When the combustion engine starts it will accelerate the speed of rotation of the shaft D. This accelerated speed cannot, however, be transmitted to the starting motor by reason of the irreversible character of the gearing C or other resistance and consequently causes the disengagement of the clutch, by reason of the cam shape of the notches I, from the spiral gearing G in thus forcing the latter in the opposite direction from that in which it is actuated by the starting motor as a driver. As a consequence the clutch H will be disengaged, which will uncouple the spiral gear G from the shaft D and permit the latter to run idly.

This simple construction of mechanism is all that is necessary for the operation of the starting mechanism under normal conditions. There is, however, danger of back-firing of the combustion motor, which, by reason of the irreversible gearing C or the resistance of the parts and the positive driving connection to the engine shaft, will cause the stripping of the gears or the breaking of some part of the mechanism. I have therefore introduced an automatic release which will relieve the mechanism from such abnormal stresses without interference with the transmission of normal power. This automatic release is preferably a duplicate of the automatic clutch H applied to the gear F, and, as shown, a cross-pin J in the shaft B is in engagement with notches K in the end of the gear F. The driving side of the notch K is inclined substantially parallel to the pitch of the gear, while the parts are retained normally in engaged position by the tension of a spring L sleeved on the shaft B and bearing against the opposite end of the gear F. In normal operation the tension of the spring L is sufficient to hold the pin J in driving engagement with the gear wheel F, but any abnormal stress by increasing the end thrust upon the gear F will cause the compression of the spring L and the release of the clutch. Such would be the case in back-firing and also where through any cause the combustion motor is held from movement when the starter is thrown into operation. In all such cases the spring L will yield but will instantaneously reëngage the clutch so as to render the mechanism at all times operative.

In the modification shown in Fig. 3, in place of forming the clutch between the gear wheel F and the shaft B, said parts remain in fixed relation, but together are moved axially under abnormal end thrust. The clutch is arranged between the shaft B and the worm gear wheel C, which latter is provided with a sleeve M passing out through the casing N. The outer end of this sleeve is notched at O, which notch is engaged by a cross-pin P in the shaft B, said pin being held in normal engagement with the notch by the tension of the spring L.

Another advantageous feature of my construction is the capability of yieldingly picking up the load. This is due to the fact that the driving torque is limited to the force of the spring opposing the end thrust of the spiral gear; and consequently any stress in excess of this force will cause the spring to yield, and if sufficiently great to throw out the clutch. This is particularly advantageous in connection with an electric starter, as it permits the rotor to move and avoids drawing the heavy current from the storage battery, which would be necessary in overcoming the inertia of a dead load.

What I claim as my invention is:

1. In a transmission device for starting motors, the combination with two rotary members of a transmission therebetween, including spiral gears and a clutch, one of said spiral gears being transversely movable relative to the other gear and adapted to couple said clutch when actuated by one of said rotary members, and to uncouple said clutch when the speed of rotation of the other of said members is greater than that of the first named member.

2. In a transmission device for starting motors, the combination with drive and driven rotary members of transmission mechanism therebetween, including an irreversible gearing and a reversible spiral gearing, and a clutch operated by the longitudinal movement of one of said spiral gears.

3. In a transmission device for starting motors, the combination with drive and driven rotary members of transmission mechanism therebetween, including an irreversible gearing and a reversible spiral gearing, a normally disengaged clutch intermediate said spiral gearing and the driven shaft operated to be automatically coupled when driven from one of said rotary members and automatically released when the speed of rotation of the other of said rotary members is greater than that of the first-named member.

4. In a transmission device for starting motors, the combination of parallelly-arranged drive and driven shafts, a transversely-arranged intermediate shaft, an irreversible gearing between the drive shaft and said intermediate shaft, a reversible spiral gearing between said intermediate shaft and driven shaft, a clutch for coupling said spiral gearing and the driven shaft engaged when actuated by said drive shaft and disengaged from said gearing when the speed of said driven shaft is greater than that of the drive shaft.

5. In a transmission device for starting motors, the combination of a parallelly-arranged drive and driven shafts, a transversely-arranged intermediate shaft, an irreversible worm gearing between said drive and intermediate shafts, a reversible spiral gearing between said intermediate shaft and driven shaft, one of said spiral gears being longitudinally movable, and a clutch coupled by the longitudinal movement of said spiral gear in one direction and uncoupled by the movement in the opposite direction.

6. In a transmission device for starting motors, the combination with rotary drive and driven members of a spiral gear connection and a clutch therebetween, one of said spiral gears being longitudinally movable and operating to disengage and engage said clutch, a clutch also associated with the other spiral gear, and resilient means for yieldably resisting the longitudinal movement of said last-named gear to cushion the load.

7. In a transmission device for starting motors, the combination with parallel rotary drive and driven members, and an intermediate shaft; of a pair of intermeshing gears between said driven member and said shaft, each of said gears being longitudinally movable, a clutch adapted to respectively couple and uncouple said driven member to and from one of said gears upon the actuation of the latter by said drive member and said shaft, a second clutch coöperating with said shaft and the other of said gears, and resilient means for yieldingly resisting movement of the last-named gear to disengage the last-named clutch.

In testimony whereof I affix my signature in presence of two witnesses.

THEODOR M. MUELLER.

Witnesses:
Wm. J. Belknap,
James P. Barry.

Copies of this patent may be obtained for five cents each, by addressing the "Commissioner of Patents, Washington, D. C."